United States Patent
Tan et al.

(10) Patent No.: US 12,387,435 B2
(45) Date of Patent: Aug. 12, 2025

(54) DIGITAL TWIN SUB-MILLIMETER ALIGNMENT USING MULTIMODAL 3D DEEP LEARNING FUSION SYSTEM AND METHOD

(71) Applicant: GridRaster, Inc., Mountain View, CA (US)

(72) Inventors: Yiyong Tan, Mountain View, CA (US); Bhaskar Banerjee, Mountain View, CA (US); Rishi Ranjan, Mountain View, CA (US)

(73) Assignee: GRIDRASTER, INC., Mountain View, CA (US)

( * ) Notice: Subject to any disclaimer, the term of this patent is extended or adjusted under 35 U.S.C. 154(b) by 338 days.

(21) Appl. No.: 17/711,695

(22) Filed: Apr. 1, 2022

(65) Prior Publication Data
US 2023/0115887 A1 Apr. 13, 2023

Related U.S. Application Data

(63) Continuation-in-part of application No. 17/575,091, filed on Jan. 13, 2022, now Pat. No. 12,125,146, (Continued)

(51) Int. Cl.
| | |
|---|---|
| G06T 19/00 | (2011.01) |
| G06F 18/25 | (2023.01) |
| G06N 3/045 | (2023.01) |
| G06N 5/04 | (2023.01) |
| G06N 20/10 | (2019.01) |

(52) U.S. Cl.
CPC ............ *G06T 19/006* (2013.01); *G06F 18/25* (2023.01); *G06N 3/045* (2023.01); *G06N 5/04* (2013.01); *G06N 20/10* (2019.01)

(58) Field of Classification Search
CPC ......... G06T 19/006; G06T 2207/10028; G06T 2207/20084; G06T 7/30; G06F 18/25; G06F 18/251; G06F 18/23; G06N 3/045; G06N 5/04; G06N 20/10; G06N 3/0464;
(Continued)

(56) References Cited

U.S. PATENT DOCUMENTS

| | | |
|---|---|---|
| 6,160,808 A | 12/2000 | Maurya |
| 9,677,840 B2 | 6/2017 | Rublowsky |

(Continued)

OTHER PUBLICATIONS

Digital Twin Demo, PTC, 2020; https://www.youtube.com/watch?v=ERa8sN837hO (Year: 2020).

*Primary Examiner* — Jianxun Yang
(74) *Attorney, Agent, or Firm* — Manatt, Phelps & Phillips, LLP

(57) ABSTRACT

A mixed reality (MR) system and method performs alignment of a digital twin and the corresponding real-world object using 3D deep neural network structures using multimodal fusion and simplified machine learning to cluster label distributions (output of 3D deep neural network trained by generic 3D benchmark dataset) that are used to reduce the training data requirements to directly train a 3D deep neural network structures. In one embodiment, multiple 3D deep neural network structures, such as PointCNN, 3D-Bonet, RandLA, etc., may be trained by different generic 3D benchmark datasets, such as ScanNet, ShapeNet, S3DIS, inadequate 3D training dataset, etc.

23 Claims, 13 Drawing Sheets

Related U.S. Application Data which is a continuation of application No. 17/320,968, filed on May 14, 2021, now Pat. No. 11,250,637.

(58) Field of Classification Search
CPC ...... G06N 3/0895; G06N 3/096; G06V 20/20; G06V 20/70
See application file for complete search history.

(56) References Cited

U.S. PATENT DOCUMENTS

| | | | |
|---|---|---|---|
| 10,867,217 | B1 | 12/2020 | Madden et al. |
| 2003/0065817 | A1 | 4/2003 | Benchetrit |
| 2005/0027870 | A1 | 2/2005 | Trebes, Jr. |
| 2005/0047427 | A1 | 3/2005 | Kashima |
| 2006/0050697 | A1 | 3/2006 | Li |
| 2006/0080454 | A1 | 4/2006 | Li |
| 2006/0098662 | A1 | 5/2006 | Gupta |
| 2006/0159079 | A1 | 7/2006 | Sachs |
| 2007/0130585 | A1 | 6/2007 | Perret |
| 2007/0140171 | A1 | 6/2007 | Balasubramanian |
| 2007/0245010 | A1 | 10/2007 | Arn et al. |
| 2007/0247457 | A1 | 10/2007 | Gustafsson |
| 2007/0273610 | A1 | 11/2007 | Baillot |
| 2008/0162670 | A1 | 7/2008 | Chapweske |
| 2009/0046140 | A1 | 2/2009 | Lashmet |
| 2009/0182815 | A1 | 7/2009 | Czechowski, III |
| 2009/0196338 | A1 | 8/2009 | Ali |
| 2009/0248872 | A1 | 10/2009 | Luzzatti |
| 2009/0254659 | A1 | 10/2009 | Li et al. |
| 2010/0225743 | A1 | 9/2010 | Florencio |
| 2010/0253700 | A1 | 10/2010 | Bergeron |
| 2011/0084983 | A1 | 4/2011 | Demaine |
| 2011/0158311 | A1 | 6/2011 | Abadir |
| 2012/0038739 | A1 | 2/2012 | Welch |
| 2012/0106921 | A1 | 5/2012 | Sasaki |
| 2013/0117377 | A1 | 5/2013 | Miller |
| 2013/0286004 | A1 | 10/2013 | McCulloch |
| 2016/0203646 | A1 | 7/2016 | Nadler |
| 2017/0150122 | A1 | 5/2017 | Cole |
| 2018/0157398 | A1 | 6/2018 | Kaehler |
| 2019/0052883 | A1 | 2/2019 | Ikeda |
| 2020/0281539 | A1* | 9/2020 | Hoernig ............... A61B 5/0035 |
| 2020/0372709 | A1 | 11/2020 | Ponjou Tasse |
| 2021/0133850 | A1 | 5/2021 | Ayush |
| 2022/0027529 | A1* | 1/2022 | Zarur ..................... G06F 30/12 |

* cited by examiner

DIGITAL TWIN SUB-MILLIMETER ALIGNMENT USING MULTIMODAL 3D DEEP LEARNING FUSION SYSTEM AND METHOD

RELATED APPLICATIONS

This application claims priority under 35 USC 120 and is a continuation in part of U.S. patent application Ser. No. 17/575,091, filed Jan. 13, 2022 and entitled "MULTIMODAL 3D DEEP LEARNING FUSION SYSTEM AND METHOD FOR REDUCING THE NEED OF 3D TRAINING DATASET OF 3D OBJECT TRACKING FOR ENTERPRISE DIGITAL TWIN MIXED REALITY" that in turn claims priority under 35 USC 120 and is a continuation of U.S. application Ser. No. 17/320,968, filed May 14, 2021 (now U.S. Pat. No. 11,250,637 issued on Feb. 15, 2022), both of which are incorporated herein by reference.

FIELD

The disclosure relates to three dimensional (3D) alignment of a real world object and a digital twin that uses deep learning and in particular to a multimodal 3D deep learning fusion system that reduces the need of 3D training dataset required by the 3D deep learning techniques to facilitate the alignment methodology.

BACKGROUND

The current product design process requires a lot of time and resources and typically takes multiple iterations. For example, for a car interior design process, the prevalent workflow is to do the initial design using CAD software on a PC, and then build a life scale model of the initial design using a combination of hand cut foam and 3D printed plastic models. The designer then assembles the foam and 3D printed plastic models inside a hollow car to evaluate the design. Based on review from the team and management, the designer makes changes in the design, and repeats the whole workflow process so that this conventional design process takes a lot of time and resources and requires several iterations to perform design work using this conventional technique.

Precise and persistent overlay of large, complex 3D models/digital-twins on their (complete or partial) real life counter parts on a mixed reality (MR) head mounted device (HMD), such as the Microsoft HoloLens, could be critical enterprise use cases for design, training, assembly, and manufacturing to be performed. In the design process using MR, the designer can render the 3D CAD model in full life-size scale, with high fidelity (millions of polygons and high quality texture) and place it precisely (with the tolerance of a few millimeters) at the desired location inside the same car as was done in the known design process. Using MR, the designer does not have to put together the physical "mock-up" using foam and 3D printed models. Furthermore, the MR world can be shared by multiple users simultaneously across multiple HMDs. The review and feedback can be incorporated as design changes in the CAD file and can be brought into the HMD in near real time that would save a lot of time and resources and shorten the iterations significantly.

Using known MR processes for this design process results in two technical problems/challenges that must be addressed. The two technical problems are: being able to render large complex models and scenes with 10s-100s of millions of polygons, at 60 frames per second (FPS) or higher, with less than 20 ms motion-to-photon latency; and aligning the digital twin with the real-world object with sub-10 mm accuracy. Note that these processes typically may involve millions of 3D voxels/points.

In general, to train a machine learning model (or a deep learning model), the complexity of the data being processed/analyzed must match the complexity of the machine learning model. Furthermore, to train a complicated deep learning model, a large amount of training data is required. In contrast, a simpler machine learning model is only able to process less complicated data, but thus requires a smaller amount of training data.

One way to address the above challenges for the data processing required for mixed reality systems is to use deep learning based 3D object tracking that has a complexity that matches the complexity of the data involved in the 3D object tracking. However, a technical problem is that these deep learning based 3D object tracking requires a large amount of training data to be comprehensive in order to match the complexity of the model. In the case of 3D object tracking for mixed reality, the data that could be used to train such a deep learning based 3D object tracking is typically confidential and private, so that it is often not possible to gather sufficient data to properly train the deep learning based 3D object tracking. Furthermore, manual labeling of that training data (if it could be obtained) would be difficult (especially for 3D dataset). A real-world use case requires a more efficient approach, which is less dependent on the specific training dataset but can still do full 3D scene understanding of real world 3D scene leveraging existing general training models. Thus, it is desirable to provide a technical solution to this problem that reduces the 3D training data requirement as compared to the known deep learning based 3D object tracking and thus facilitates the 3D digital twin MR system and method and it is to this end that the disclosure is directed.

The alignment technical problem has consequences for both critical and less critical applications. A critical application may be control of a medical procedure in which the alignment between a patient's tumor in a computer tomography (CT) image and where the doctor plans/marks to do treatment and positions a surgical robotics arm for the surgery on the tumor in which the alignment needs to be very accurate to complete surgery successfully. One of the major reasons a fully automatic surgery robot does not have much market in hospitals is because the submillimeter accuracy for the robotic surgery is quite hard to achieve consistently for different patients in different surgery rooms. In most cases, a 1 mm error can be a lethal catastrophe for the surgery.

Even for less critical applications, the alignment is the first step/impression that directly impacts a user's confidence to trust and follow the augmented reality/mixed reality (AR/MR) workflow for the design of the apps/products. The decision or confidence on whether the user accepts the AR workflow as the replacement of their current workflow (for example to replace physical real-world training with the training using aligned digital twin rendered by AR glass hologram) is directly impacted by the accuracy of the alignment of the said hologram with the actual real-world object. Thus, robust submillimeter alignment of the digital twin to its real-world counterpart in AR/MR is a significant technical problem that has not been fully addressed by known systems and methods.

DETAILED DESCRIPTION OF ONE OR MORE EMBODIMENTS

Figure 1:
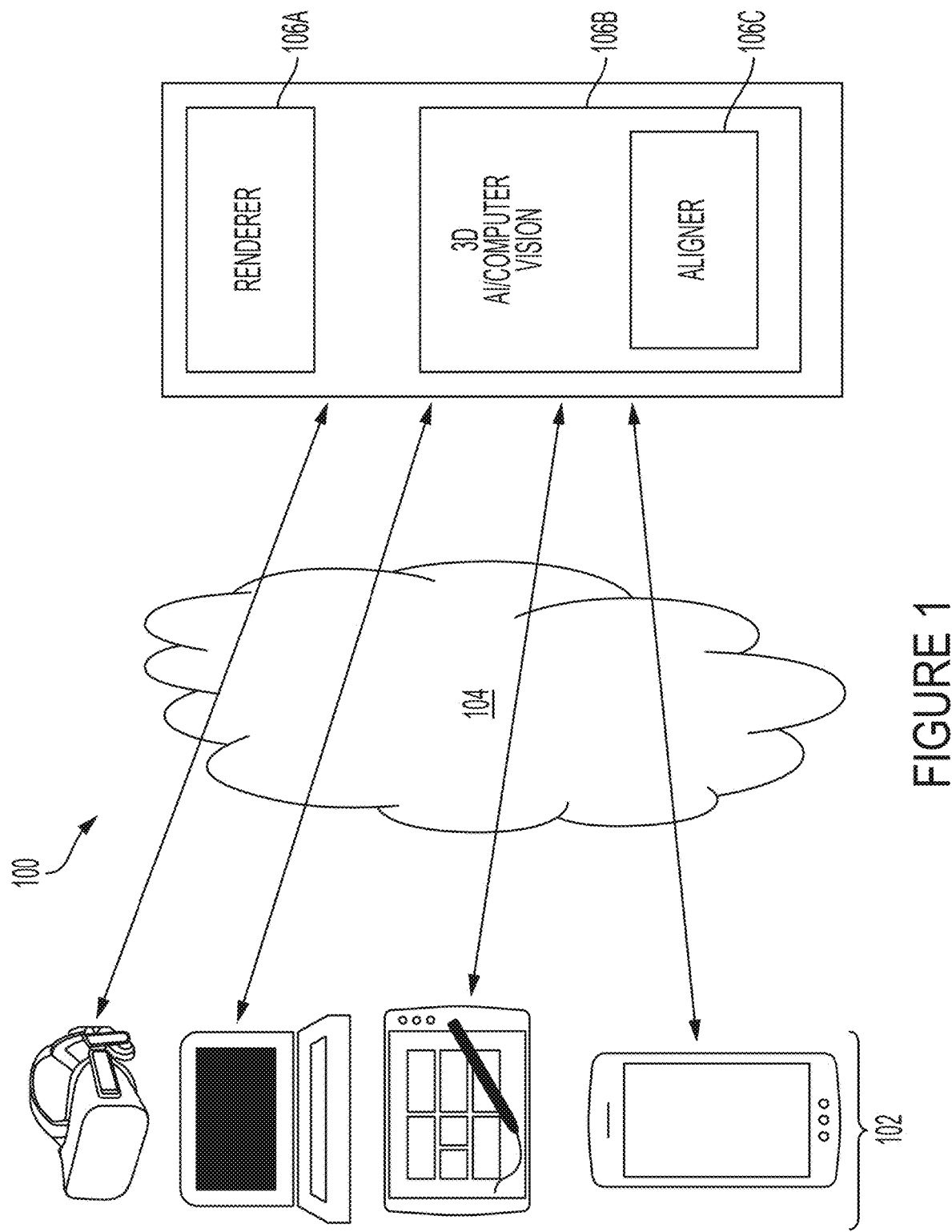
FIG. 1 illustrates a mixed reality system that may incorporate a 3D object to digital twin alignment technique with reduced training data and a machine learning model.

The disclosure is particularly applicable to a design system that uses a mixed reality system with alignment for a real-world object and a digital twin that overcomes the above technical problems and limitations of existing AR/MR systems and deep learning systems for alignment of the object and the digital twin that uses reduced training data and a simpler machine learning model and it is in this context that the disclosure will be described. It will be appreciated, however, that the system and method have greater utility since the system may be implemented with different structures and/or different benchmark 3D datasets and/or different machine learning algorithms that are all within the scope of the disclosure. Furthermore, the mixed reality system with 3D object alignment with the digital twin with reduced training data may be used for any use case in which it is desirable to be able to accurately represent a real world object using a digital twin with submillimeter accuracy.

The disclosed system and method is an alignment system and method for real world and digital twin objects in an AR/MR system that uses a multimodal system that utilizes multiple machine learning/artificial intelligence systems, such as a plurality of neural networks wherein each neural network has its own unique net topology structure which define different numerical feature behaviors when learning 3D scene features from a publicly available benchmark 3D training dataset. Same neural network topology trained by different publicly available benchmark datasets can also detect different numerical features embedded inside the chosen training dataset. The distribution of features/scene context learned in a certain pretrained model can probe certain aspects in the high dimensional feature space of real-world objects/scene point clouds so that a pretrained model trained by general benchmark data can be used as a weak classifier for specific applications. Combining inference results of multiple pretrained models can yield a full spectrum of properties (similar to the "bag-of-visual words algorithm" in computer vision for image classification and the word/letter here is defined in the features extracted from generic 3D benchmark dataset by individual pretrained deep learning model, minimum two models for following fusion procedure) of the objects so that workflow can fuse multiple weak classifiers into a strong classifier. This uncertainty reduction concept is similar to sensor fusion in autonomous driving to understand the real world driving environment, and can also be seen a painting objects/scenes by using multiple colors to maintain high fidelity of the real world).

In one embodiment, the disclosed system and method receives initial 3D data having a complexity of millions of 3D points (a point cloud). The system, using two or more machine learning systems that each generate a histogram based on public 3D training data (examples of which are set forth below) reduce the complexity of the initial 3D data to a vector of hundreds of values. The system then trains a simpler machine learning model (since the 3D data is now less complex—hundreds of histogram values vs. millions of 3D point values) that: 1) requires less training data; and 2) is able to solve the 3D object alignment problem with the complex initial 3D data (training data is often not available) and without using the deep learning model. In the disclosure below, a number of public benchmark 3D data sets are disclosed, but the system and method can be performed using different public datasets, public and private datasets or only private data sets that can train two or more deep learning models and then the features extracted from the deep learning models allows the system to reduce the complexity of the initial 3D data.

FIG. 1 illustrates a mixed reality system 100 that may incorporate a 3D object to digital twin alignment technique with reduced training data and a machine learning model. The system 100 must have one or more computing devices 102 that each may store and execute a client application to communicate over a communications path 104 to (and exchange data with) a backend system 106 that together provide an augmented reality/a mixed reality experience that benefits from the precise/submillimeter alignment of the real-world object and its digital twin. Each computing device 102 may be a processor based device that has one or more displays and memory and can generate a mixed or augmented reality environment (images or videos) user interface based on data and commands communicated from the backend system 106. As shown in FIG. 1, the computing device 102 may be a headset, a laptop, a tablet computer and/or a smartphone device. In some cases, each of the computing devices may be the headset that is particularly suited for generating augmented/mixed reality user interfaces. For example, the headset typically has a separate display for each eye so that a different augmented/mixed reality stream may be displayed to each eye further promoting the 3D aspect of the augmented/mixed reality. Examples of the headset may be the Microsoft® HoloLens and the Oculus® Quest commercial products. In the case of the headset, it may have firmware/code that is executed by the processor of the headset while the other computing devices may have an augmented/mixed reality app that is executed by the processor. The augmented/mixed reality system shown in FIG. 1 may be used for various augmented/mixed reality application, such as robotic surgery or designing a product, that would benefit from a technical solution to the alignment of the real world object and the digital twin technical problem noted above.

As shown in FIG. 1, each computing device 102 and the backend 106 may be remote from each other in this embodiment, but it is also possible to have a mixed reality system in which the computing device 102 and the backend 106 are integrated together. One technique that is performed as part of the augmented/mixed reality by the system 100 and the backend 106 is the precise alignment of the real world object (represented by points in a point cloud) with a digital twin in the augmented/mixed reality world. In a known system, this alignment may be performed using a deep learning algorithm for the complex 3D data in which it is necessary to train the deep learning algorithm using a large amount of training data which is a technical problem that limits the utility of these typical systems. In the known systems, the alignment is often centimeter alignment that is the second technical problem that limits the applications of known systems. The system 100 and in particular the backend 106 may provide a technical solution to this problem by: 1) reducing the complexity of the 3D (millions of 3D points XYZ value to hundreds of values in a multidimensional vector) data using two or more machine learning models with benchmark 3D training data that each generate histograms and together generate a reduced set of training data; 2) training a simpler machine learning model using the reduced training data; and 3) using the trained machine learning model to provide submillimeter alignment between the real world object and the digital twin.

As shown in FIG. 1, the backend 106, to generate the AR/MR data and environment and perform the submillimeter alignment may further comprise a renderer element 106A and a three dimensional AI/computer vision element 106B that generates, renders and sends the AR/mixed reality data to each computing device using known data transfer protocols. The three dimensional AI/computer vision element 106B may further comprise an alignment element 106C that performs a technically complicated 3D object to digital twin alignment methodology for the augmented/mixed reality data as shown in the example discussed below. The aligner element 106C (and the alignment process) is improved by the below disclosed multimodal fusion process. In one embodiment, the aligner component 106C includes an inference engine that performs the method 500 shown in FIGS. 4A and 4B to improve the object and digital twin alignment. The backend 106 may be implemented as a computer system, such as one or more server computers, blade servers, cloud computing systems, etc. that have at least one processor, memory and circuits to communicate and exchange data with each computing device 102. Each of the elements 106A-106C may be implemented as a hardware circuit or device or as a plurality of lines of computer code/instructions that are executed by the processor of the backend computer system 106 so that the processor or hardware circuit or device are configured to perform the operations of each of the elements or each of the hardware circuits perform those operations that include the alignment process as detailed below.

Figure 2:
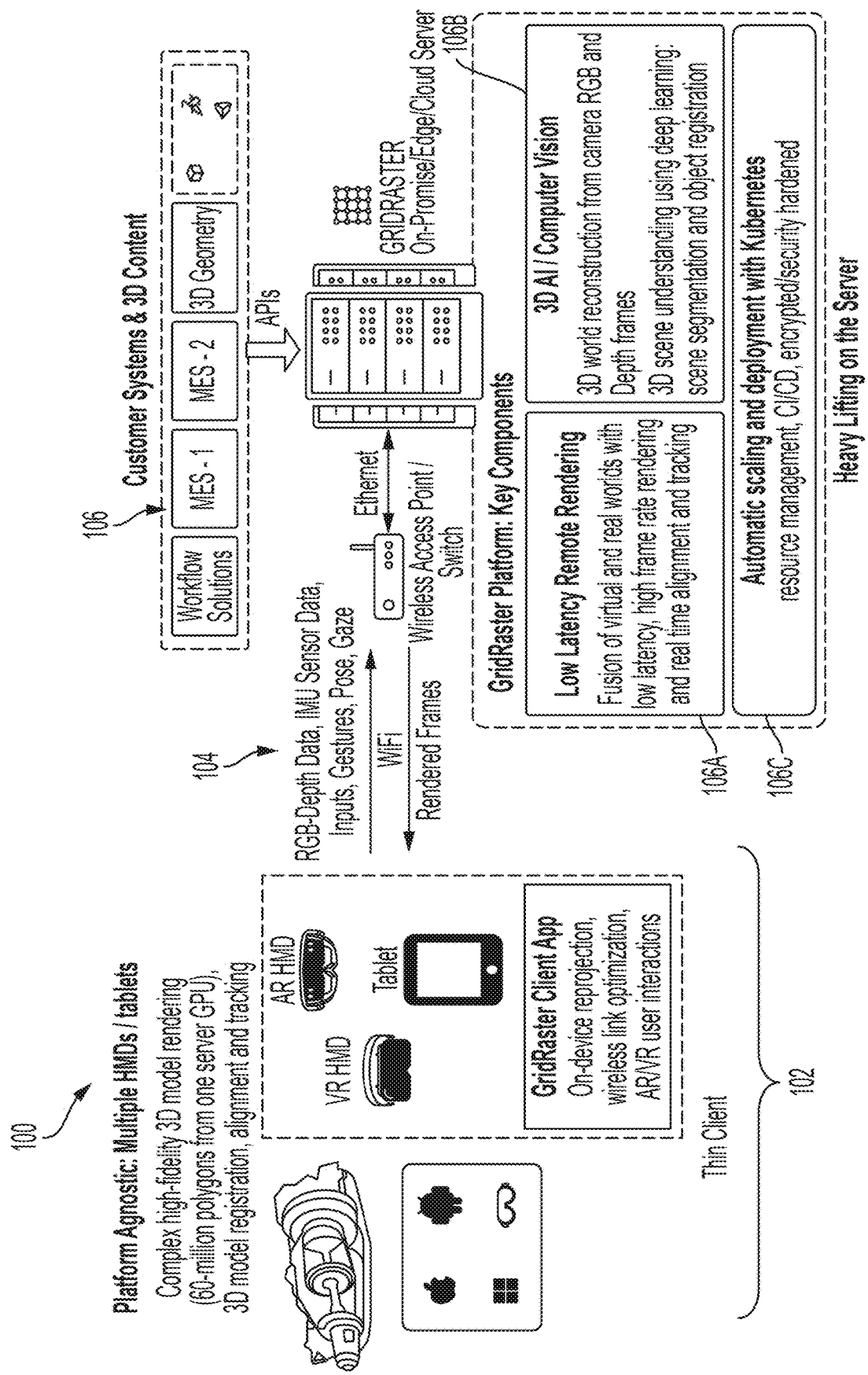
FIG. 2 illustrates an implementation of the mixed reality system in FIG. 1.

FIG. 2 illustrates an implementation of the augmented/mixed reality system 100 in FIG. 1 and shows more details of at least one computing device 102, the communication path 104 and the backend 106. Each computing device 102 may include a client application that performs functions and operations for on-device reprojection, wireless/wired link optimization and augmented reality (AR)/virtual reality (VR) user interactions. As part of the mixed reality, each computing device 102 performs complex high-fidelity 3D model rendering (such as 60-million polygons from one server GPU), performs 3D model registration to the underlying video and performs alignment of the model and the video and tracking. The alignment and tracking are part of the processes performed by a 3D object tracking process that is part of the server application.

During the mixed reality environment sessions, various data is exchanged over the communication path 104. Specifically, RGB-depth data (and XYZ data) of the video/images, inertial measurement unit (IMU) sensor data, inputs, gestures, poses and gazes may be communicated from each computing device 102 to the backend while the backend 106 may communicate rendered frames for the mixed reality to each computing device 102 wherein the rendered frames are reprojected and customized to each computing device 102 based on the data provided from the computing device 102. In the example shown in FIG. 2, the communication path may use a WiFi network and Ethernet.

The backend 106 may use well known application programming interfaces (API) to receive data from various third party systems including workflow solutions, MES (Manufacturing execution system)-1, MES-2, 3D Geometry, etc. The renderer 106A may perform low latency remote rendering that fuses virtual and reality worlds with low latency, high frame rate rendering and real time alignment and tracking, The 3D AI/computer vision element 106B performs 3D world reconstruction from camera RGB data and depth (XYZ) frames. The 3D AI/computer vision element 106B also performs 3D scene understanding using deep learning scene segmentation and object registration which are also technical processes that are improved by the multimodal fusion as described below.

The system 100 shown in FIGS. 1-2 may be used to generate a mixed reality environment that may include 3D object submillimeter alignment with a digital twin. The precise overlay/alignment of a 3D model (known as the digital twin) with an actual object in a scene helps in medical applications as discussed above, industrial design, assembly, training, and also to catch any errors or defects in manufacturing. The system allows the user to also track the object(s) and enhance the rendering as the work progresses.

Most conventional on-device object tracking systems use a 2D image and/or marker based tracking that severely limits overlay accuracy in 3D because 2D tracking cannot estimate depth with high accuracy and consequently the scale, and the pose. This means with a conventional system, even though the user gets what looks like a good match when looking from one angle and/or position, the overlay loses alignment as you move around in six degrees of freedom (6DOF). Also the 3D object tracking, identification and its scale and orientation estimation—called object registration—is achieved, in most cases, computationally or using simple computer vision methods with standard training libraries (examples: Google MediaPipe, VisionLib). This works well for regular and/or smaller and simpler/generic objects such as hands, faces, cups, tables, chairs, wheels, regular geometry structures, etc. However, for large and complex/uniquely designed objects in enterprise use cases, labeled training data (more so in 3D) is not readily available. This makes it difficult, if not impossible, to use the 2D image based tracking to align, overlay, and persistently track the object and fuse the rendered model with it in 3D. These are some of the technical problems with existing/conventional systems.

The disclosed system solves these technical problems by providing a technical solution. For example, for 3D object to digital twin alignment, the system and method may perform a detailed 3D scene understanding following the workflow discussed below. Given the computation limitations of some computing devices 102, such as the HoloLens, the entire 3D processing may be done on the backend computer system 106, with discrete high end GPUs, where the color (RGB) and depth (D) data (RGBD) from the camera of the computing device 102 may be used to reconstruct a full 3D point cloud with complete texture mapping. A fine mesh is then generated using this 3D depth map and the relation between different parts of the scene is established. Both the RGB data and the depth data is used to segment the scene as discussed below.

Figure 3A:
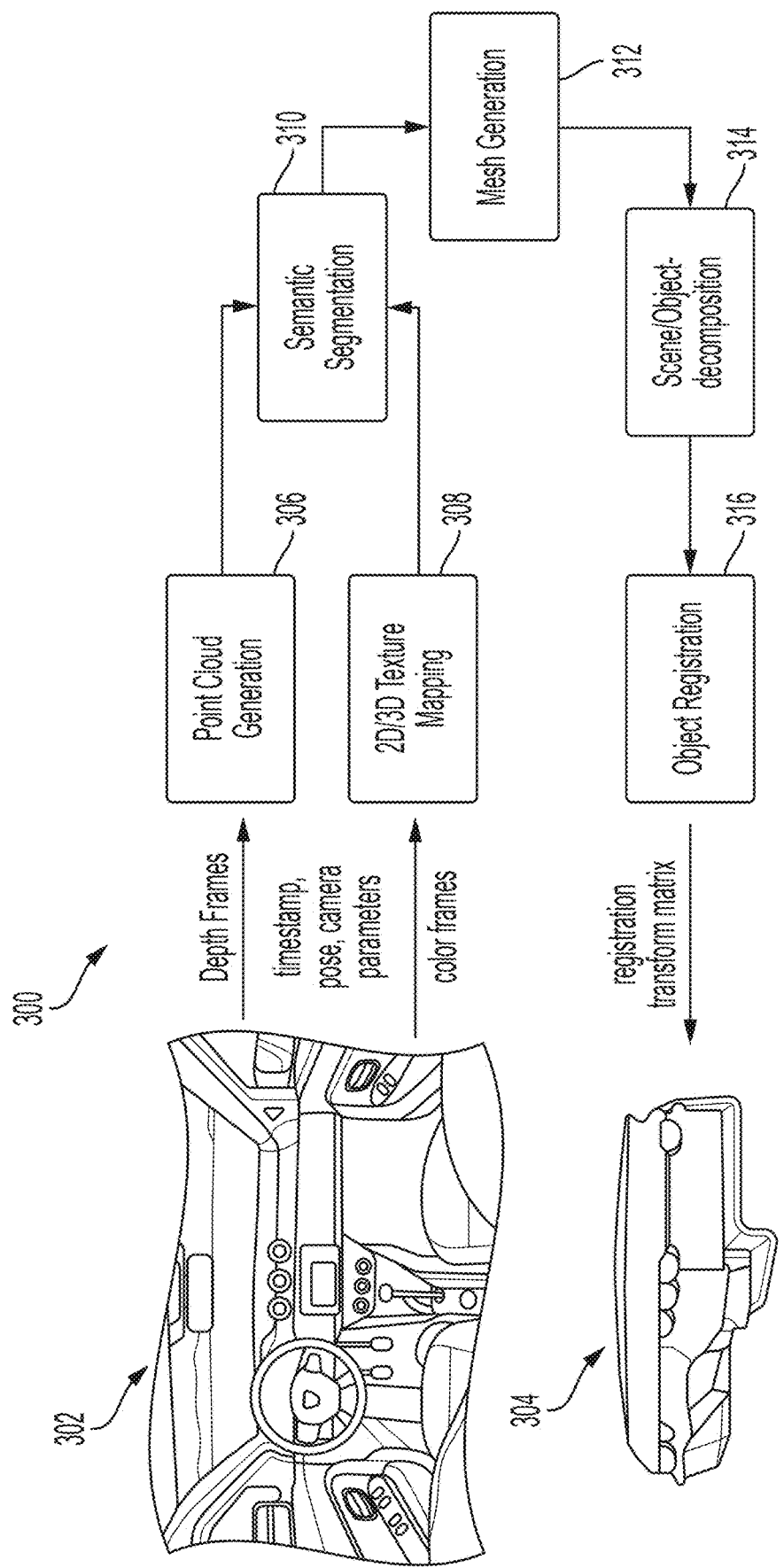
FIG. 3A illustrates a process for an augmented/mixed reality using the alignment of the object and digital twin with reduced training data.

In the example in FIG. 3A, the object of interest is the car dashboard. The system 100 and its elements are able to isolate the dashboard from the rest of the scene 302 by identifying its features using our deep learning based inference engine (for example part of the object detector 106C in FIG. 1) that matches the object in the scene to the 3D model/digital-twin. The inference engine then automatically determines the alignment of the object in the scene and a digital twin.

The deep learning based 3D AI allows the system to identify 3D objects of arbitrary shape and size in various orientations with high accuracy in the 3D space. This approach is scalable with any arbitrary shape and is amenable to use in enterprise use cases requiring rendering overlay of complex 3D models and digital twins with their real world counterparts. This can also be scaled to register with partially completed structures with the complete 3D models, allowing for ongoing construction and assembly. The system and method achieve a submillimeter accuracy in the object registration and rendering using the system that illustrates the improvement over conventional systems that cannot achieve that accuracy. This approach to 3D object alignment will allow the system to truly fuse the real and virtual worlds, opening up many applications including but not limited to: training with work instructions, defect and error detection in construction and assembly, guided robotic surgery and 3D design and engineering with life size rendering and overlay.

Figure 3B:
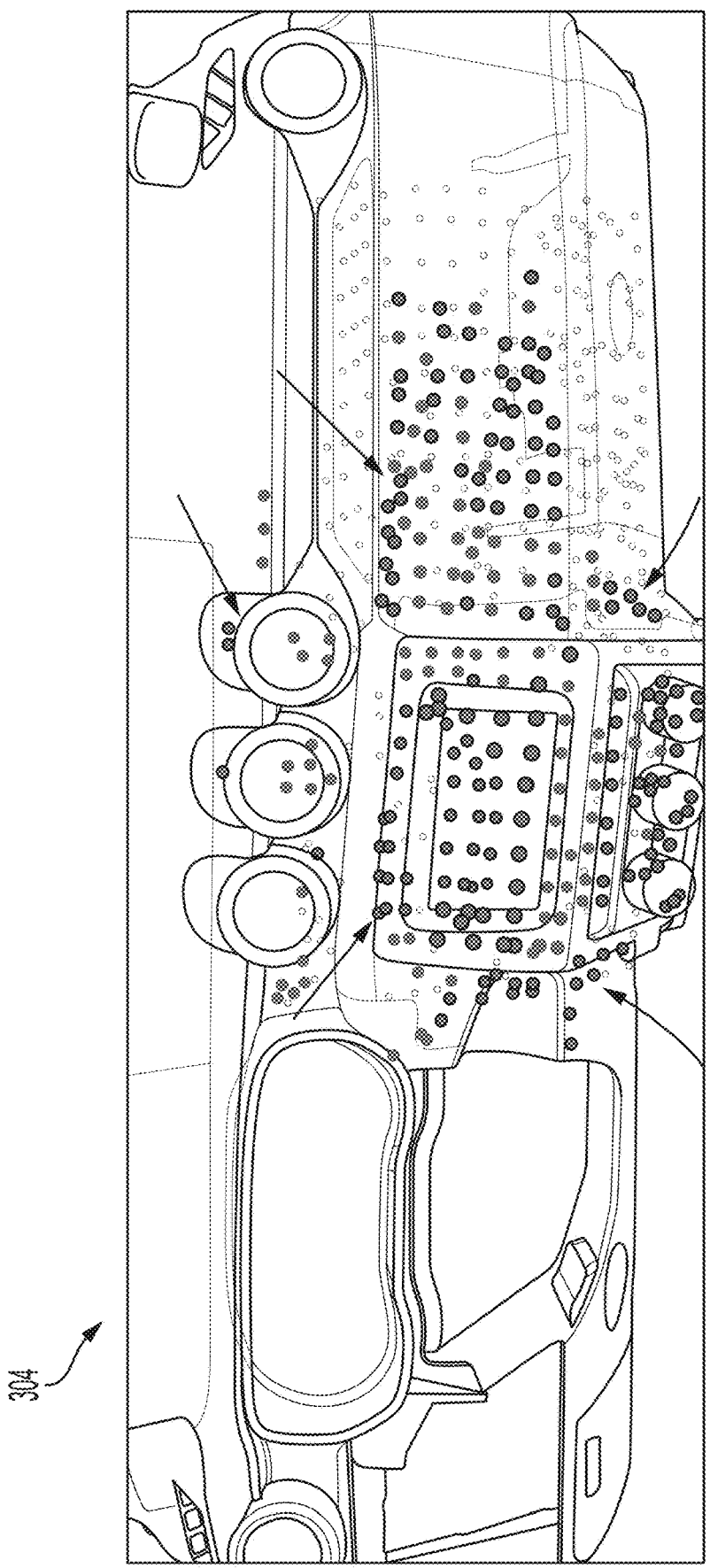
FIG. 3B illustrates the car dashboard and an alignment of a digital twin for the car dashboard.

FIG. 3A illustrates a process 300 for a mixed reality using reduced training data that starts with an image/video 302 of a real-life object, like a cockpit of an automobile, and a 3D model of the cockpit 304 that can be used in a mixed reality environment. As shown, depth frames may be generated from the image/video by the system and fed into a point cloud generation process 306. In addition, timestamps, pose, camera parameters and the captured image/video and color frames from the image/video are input to a 2D/3D texture mapping process 308. The outputs of the point cloud generation 306 and the texture mapping 308 may be input to a semantic segmentation process 310. The semantic segmentation is a process in the point cloud generated by which the digital image/video 302 may be partitioned into multiple segments wherein each segment is a set of 3D points of same label object with the goal to simplify the image/video 302 and locate an object in the current 3D scene 302. The output from the segmentation is fed into a mesh generation process 312 that generates the mesh for the 3D object 304 to be generated that represents the image/video 306. The results of the mesh generation 312 may be input to scene/object decomposition process 314 to isolate the real world counterpart of digital twin and an object registration process 316 to align the 3D digital twin model 304 to real world counterpart (3D points cluster) of digital twin. This image and 3D processing is improved as a result of the multimodal fusion process and system. The system and method shown in FIGS. 4A-10B uses the reduced training data and performs the submillimeter alignment of the object in the scene (represented by data in the point cloud) to the digital twin as will now be disclosed an example of the sub-millimeter alignment of a 3D object, like the car dashboard, and a digital twin is shown in FIG. 3B in which the dots represent points of the digital twin that are aligned with the car dashboard and the arrows point to the real world points which confirm the submillimeter accuracy in multiple regions of digital twin car dashboard.

Alignment Process Using Multimodal Fusion to Reduce Training Data Process

Figure 4A:
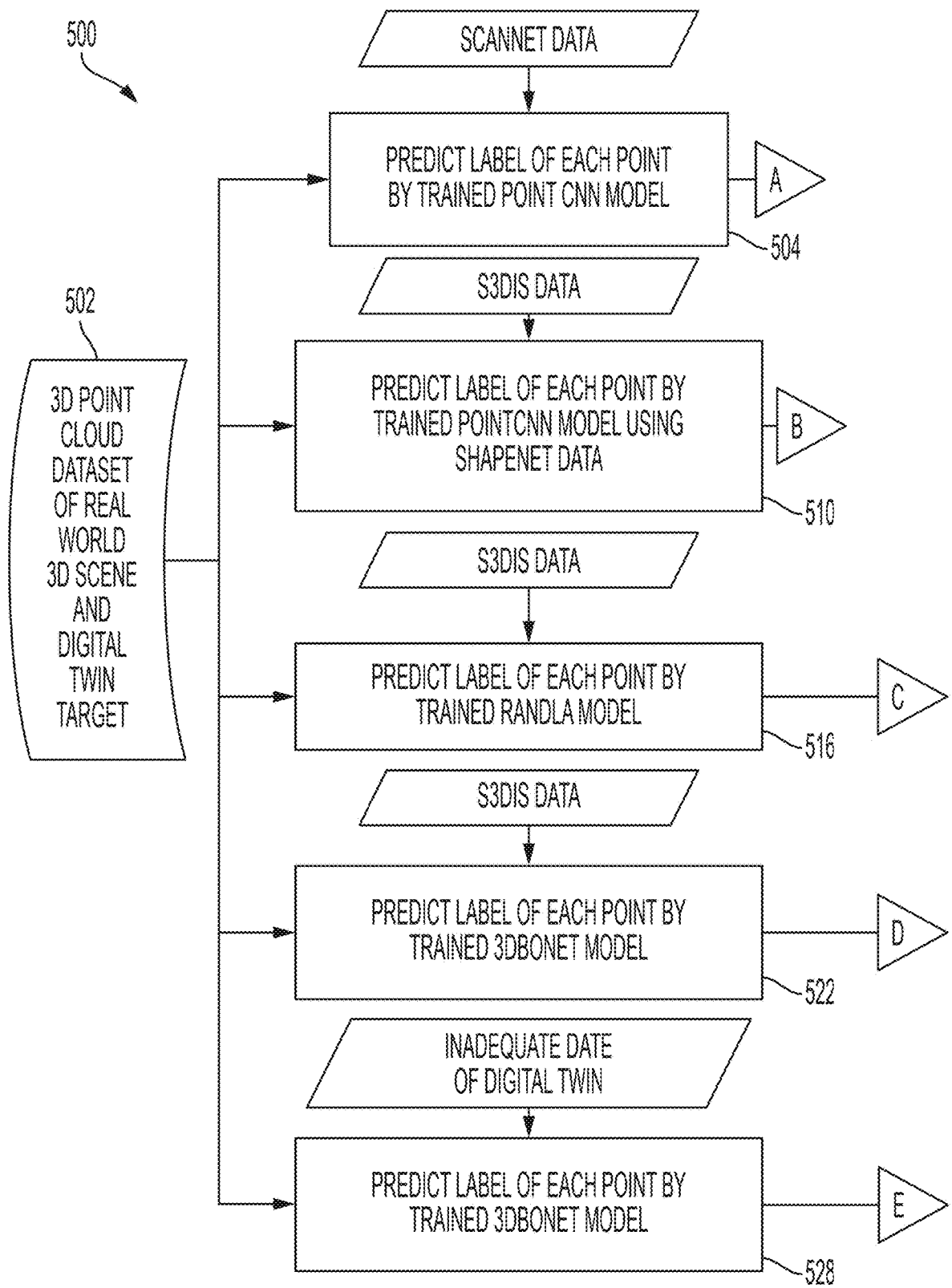
FIGS. 4A and 4B illustrate more details of the alignment method with the reduced training data.
Figure 4B:
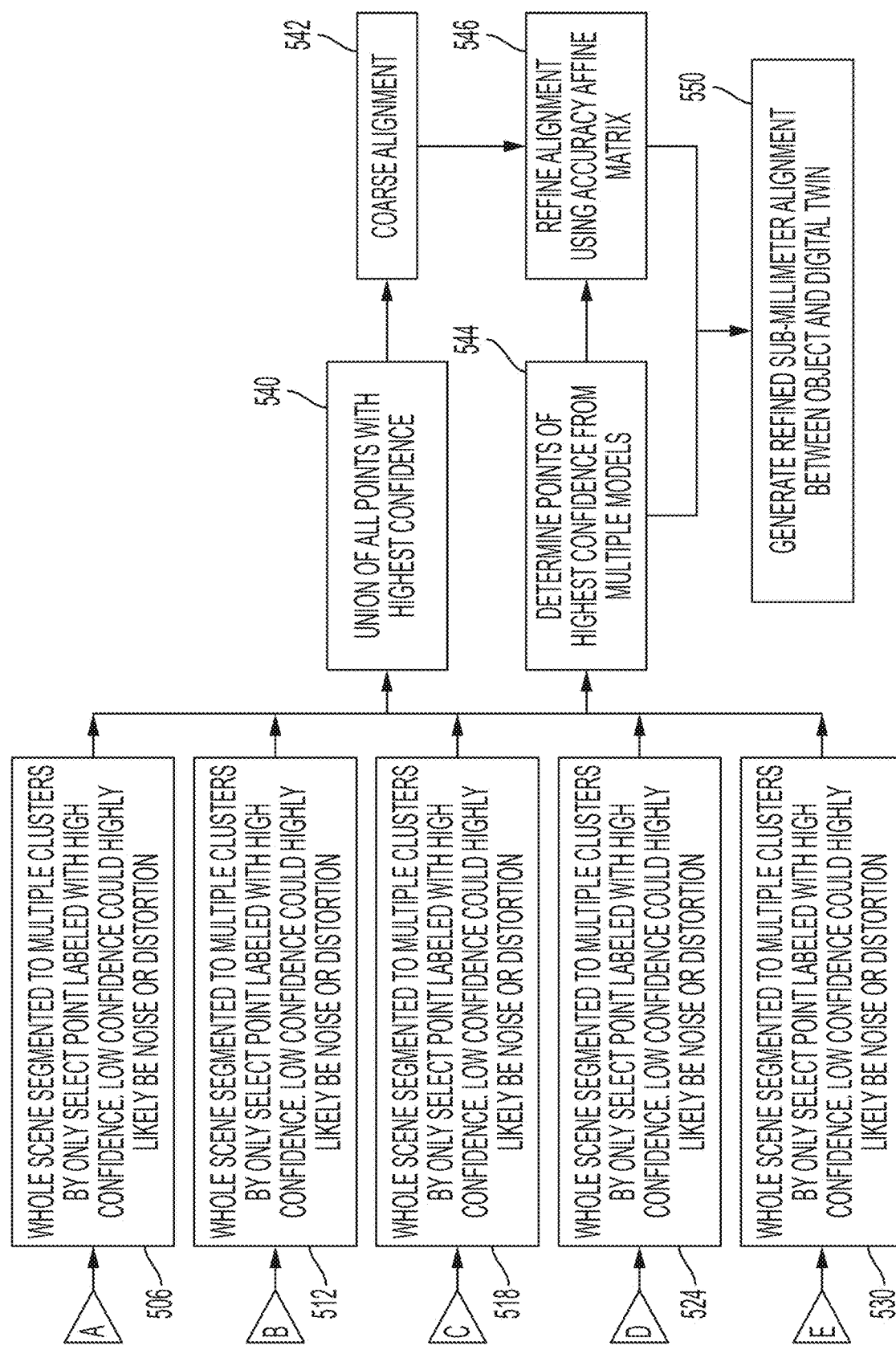

FIGS. 4A and 4B illustrate more details of an alignment method 500 with the reduced training data. The method 500 may be performed by the aligner 106C in FIG. 1 and the mixed reality system described above may also be implemented using other systems in which it is desirable to improve image processing and 3D object alignment as part of a larger system and method. In one embodiment, the processes of the method 500 shown in FIGS. 4A and 4B may be each implemented as a plurality of instructions/code that are executed by a processor of a computer system of the backend 106 wherein the instructions/code configure the processor or cause the processor to perform the below described processes.

In one example use case, the method is being used to align an object in a scene represented by a point cloud (industrial design, manufacturing, medical, etc. in which it is desirable to have submillimeter accuracy) and a digital twin target as described above and the method may receive a 3D point cloud dataset of a real world 3D scene and digital twin target data (502), with examples of that data shown in FIGS. 6-10B and described below. This data may be collectively called "input data" in the description below. The input data may be input to a plurality of machine learning process 504, 510, 516, 522, 528 (multimodal fusion). Each machine learning process may be pre-trained with data so that each machine learning process is pre-trained and thus does not require the normal training process. For example, a deep learning model (such as a known PointCNN model) (504) may be pre-trained with an adequate benchmark generic dataset (such as a known ScanNet Data). The pre-trained machine learning process 504 may then predict labels of each 3D point of the current 3D scene using the trained model. The method may then use the predicted labels from the training model to perform a whole scene segmentation into multiple clusters (506) in which only points labeled with high confidence are selected since low confidence points are highly likely to be noise or distortion. The correspondence between real world 3D point cloud and digital twin CAD model (a point cloud model can be generated from the digital CAD model) is the most critical factor that directly impact the accuracy of alignment. A point labeled as high confidence is a point that is more likely to be paired/match (e.g., align with) a point in the point cloud generated from the digital twin CAD target in virtual world while the low confidence point is more likely to be a point from the background clutter, random background points, noise or distortion (e.g., not in good alignment) and thus not likely paired/match with a point in the point cloud of the digital twin target in virtual world. The definition of high confidence (and thus low confidence) depends on a particular application and how much features the DNN (deep neural network) model can extract from a current point cloud. For example, a default may be that a top 20% best confidence score points of certain category may be a high confident region (DNN model predict each 3D point as a category class with a confidence score 0-1.0 which defines algorithm's confidence level to classify the 3D point to the certain pretrained category). If the top 20% does not yield best results either because too many points with noise or distortion or too few points to achieve signal/noise ratio (S/N)>1 (# of good quality point/># of noise/distortion point), the definition of high confidence may be adjusted to top 10% or top 30% as high confidence points, respectively.

A second machine learning process (such as the same known PointCNN model) (510) may be trained with data (such as a known S3DIS dataset). The pre-trained machine learning process 510 (pre-trained with a different data set) may then predict labels (high confidence and low confidence of point on object) of each point using the trained model. The method may then perform a whole scene segmentation into multiple clusters in which only points labeled with high confidence are selected since low confidence points are highly likely to be noise or distortion as discussed above. Unlike the first ML process, this prediction process 510 is done using the same ML model (PointCNN) but with a different training data set (ShapeNet benchmark data). For a deep learning model (like PointCNN or the other models shown in FIG. 4A), if different training dataset (different set of 3D point cloud and the label of all 3D point in point cloud) are used to train a deep neural network (DNN) model, it results in different weights inside each node of neural network thus changing the inference behavior of the model (literally different training data create different flavor/behavior of same neural network). For example, different training data can guide the DNN model to emphasize extracting different aspect/information of 3D point cloud so that the differently trained DNNs become sensitive to cover multiple aspects (color, geometry curvature, structure semantic relationship, XYZ spatial density) of objects. This is the multimodal fusion aspect of this process.

Returning to FIG. 4A, a third machine learning process (such as the known RandLA model) (516) may be trained with data (such as a known S3DIS dataset). The pre-trained machine learning process 516 (pre-trained with a different data set) may then predict labels of each point using the trained model like the other models. The method may then perform a whole scene segment to multiple clusters (518) as above to generate and select high confidence point clusters.

A fourth and fifth machine learning process (such as the known 3D Bonet model for both processes) (522, 528) may be trained with data (such as a known S3DIS dataset and an inadequate data set, such as inadequate data of the digital twin target). An inadequate dataset has data whose complexity is less complicated than the model's complexity. The deep learning model only needs to use part of its neural nodes to predict (more like memorize) the correct label for all training dataset. In this case, deep learning model only need to do a memory/projection to finish training. This unsuccessful training is called overfitting or memorizing mapping, and even the deep learning model can get 100% accuracy in training data, for any unseen real world datasets, the accuracy will be much worse and not meet product quality, so the deep learning model will be practically useless. Each of these pre-trained machine learning processes 522, 528 (each pre-trained with a different data set) may then predict labels of each point using the pre-trained model. The method may then perform the whole scene segment to multiple clusters with selected high confidence points as discussed above (524, 530) for each model. Although FIGS. 4A and 4B show three learning models being trained by four different training data sets to get best results, the method may be performed with fewer or more learning models and training data sets for certain use cases.

The minimum requirement of multimodal fusion (>=2 models) described here is two models and one 3D benchmark training data. The minimum requirement is for simple 3D digital twin use cases which are majorly composed of geometric primitives and precision/accuracy requirements are low.

The method 500 may then merge the label predictions for all of the pretrained models of the clusters into a tensor. For each cluster, the method thus has a different prediction distribution for each model and, as discussed above, each is sensitive to a different feature of the 3D data (color, geometry curvature, graph connection structure, semantic relationship, XYZ spatial density, normal vector estimation, etc.). With diverse feature information collected by different models, the system has a much better holistic understanding of target object which enhances the confidence of the label prediction generated by trained DNN model and also abstracts real world objects into a simplified representation with much reduced dimensions and complexity. Therefore, this reduced representation makes it possible to use simpler machine learning model to identify corresponding region between real world and digital twin world with much less non generic training datasets.

Figure 10A:
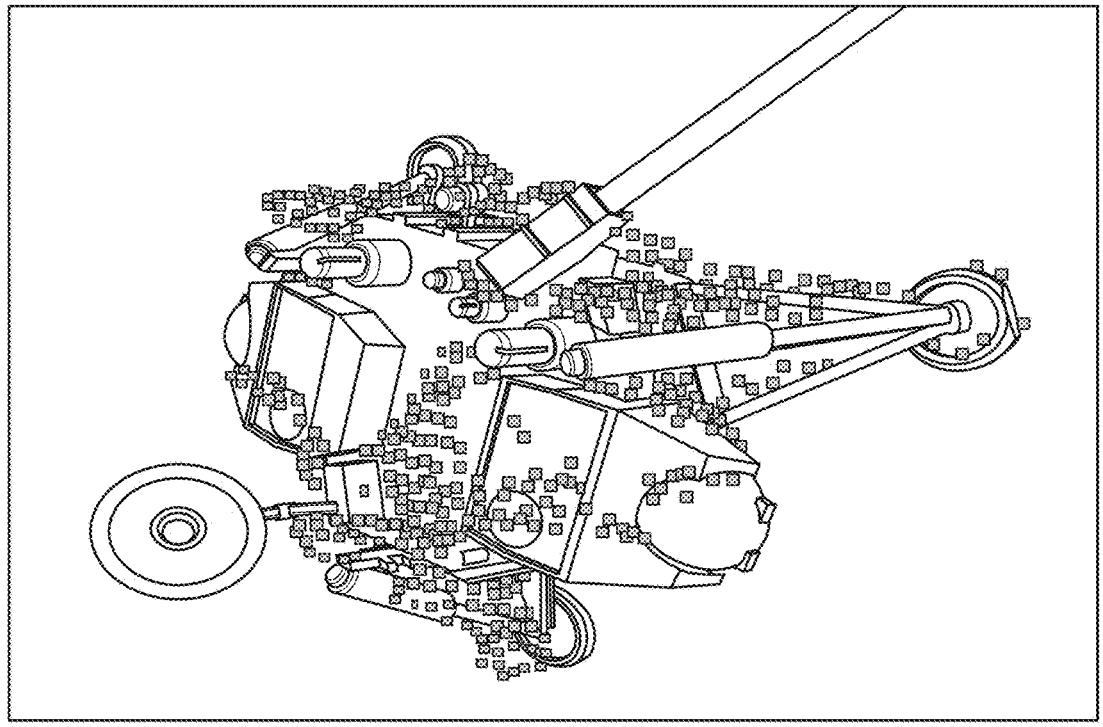
FIGS. 10A and 10B show centimeter alignment accuracy and submillimeter alignment accuracy, respectively for the exemplary object.
Figure 10B:
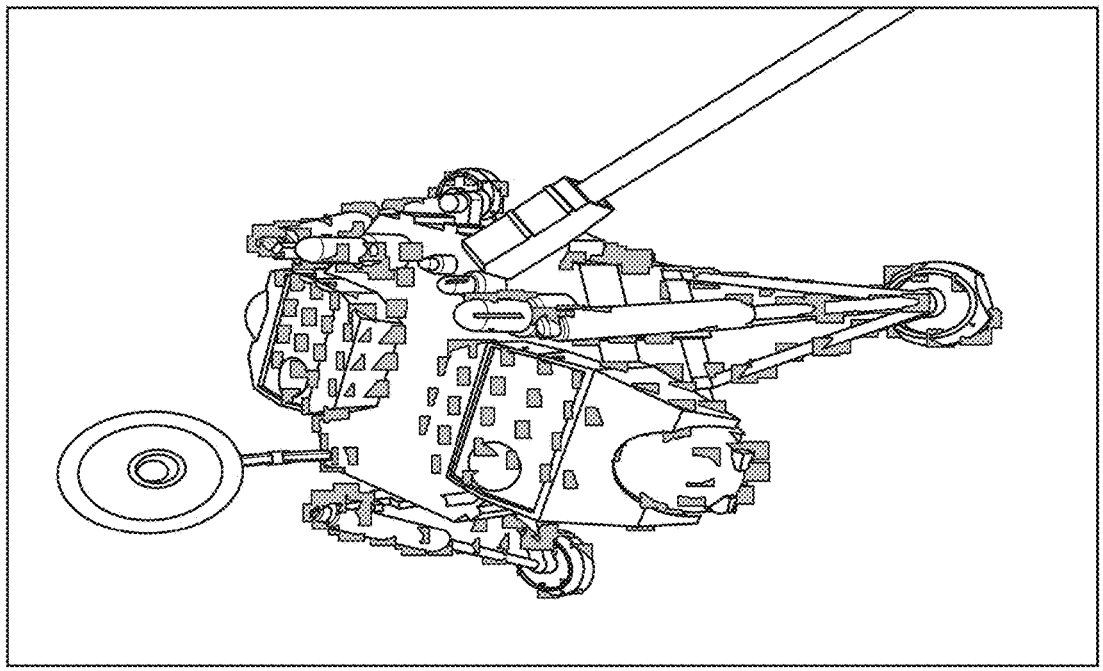

The alignment method 500 may then take advantage of the multimodal fusion of the pre-trained ML models and the clusters of high confidence points from the different models and datasets to perform the submillimeter alignment. FIG. 10A shows an image of an digital twin object, a Mars Viking lander with an alignment of points in square green from real world scanning that have centimeter accuracy that may be provided by known systems and techniques while FIG. 10B shows the same digital twin object with the submillimeter alignment points in square green from real world scanning that shows the much more precise alignment to the object and its features by using multimodal fusion. For alignment, the important region (also the specific region to differentiate one object from another) is usually feature rich region (high curvature, more connect components, high variance in RGB space or density in XYZ space), as the affine transform can be optimized by derivative of features in X, Y, Z independently. To consistently differentiate/identify high feature region from noise and distortion is critical step to get sub millimeter mm level alignment in general digital twin use cases. On the other hand, noise and distortion can also be identified, enhanced and removed using rich feature regions identification.

Figure 7B:
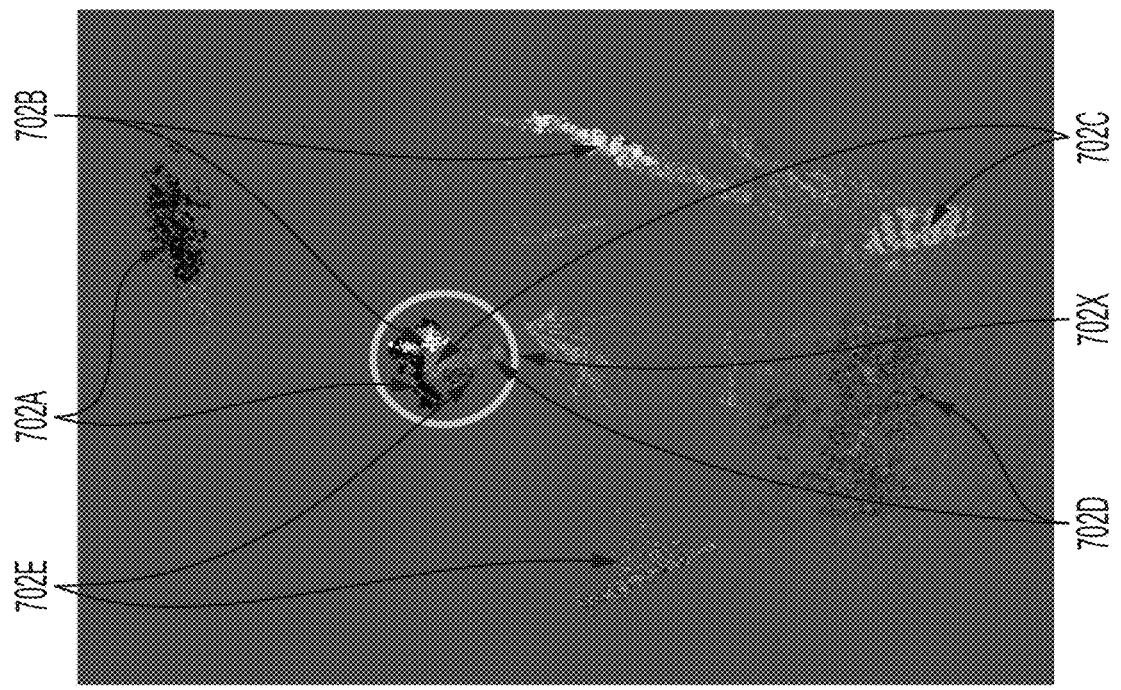
FIGS. 7A and 7B show a point cloud of the object in FIG. 6 from two different view angles.
Figure 7A:
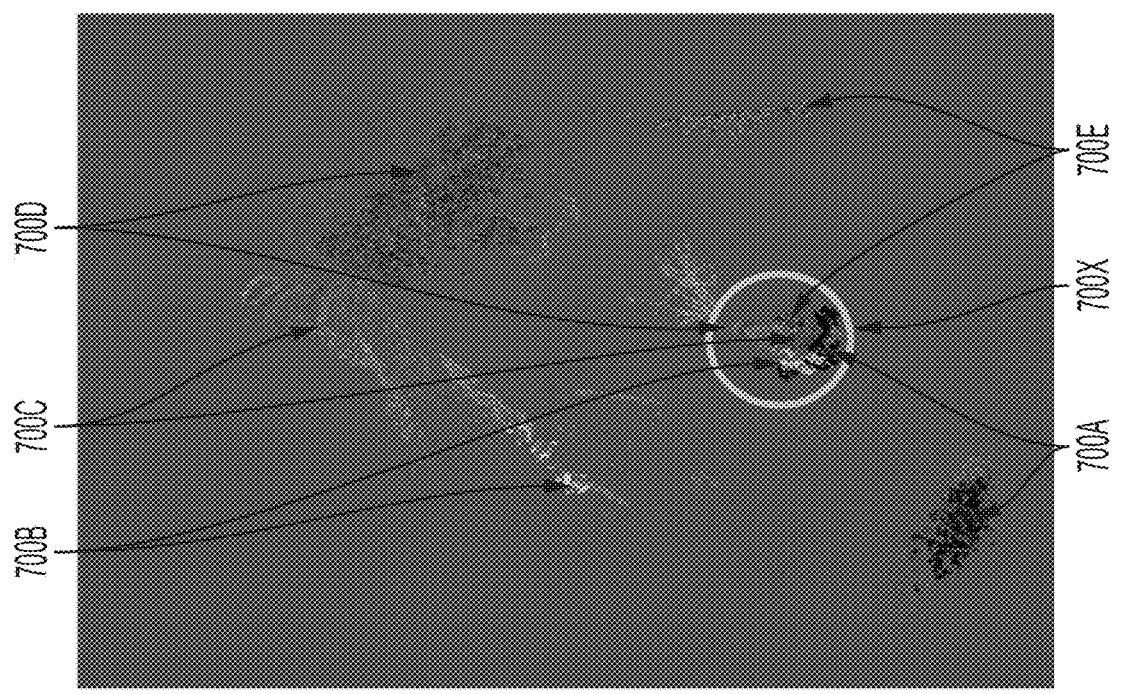

The alignment process may generate a union of all of the points of high confidence (likely paired from the real world point cloud and the reference virtual point cloud) from each of the trained models (540). This union of all of the high confidence points may be input into a coarse alignment process 542. An example of the union of points is shown in FIGS. 7A and 7B that are discussed in more detail below. The alignment process may also determine the sum of the points of highest confidence from the multiple trained models (544). In one embodiment, the process 544 may accumulate confidence (sum of the confidence from the multiple models) for an align refinement process 546 that uses only commonly detected regions or regions have multiple different labeled points adjacent to each other by multiple models in both the real world point cloud and the virtual reference point cloud of the digital twin. The align refinement process 546 may use an initial transform matrix generated by coarse alignment 542 and common/adjacent multiple labeled region intersection (which is the much smaller subset of the union of all of the points of high confidence) as input to further refine the alignment by identifying the point pairs that more closely match the real world object 3D shape to the digital twin in the mixed reality environment. A result of the alignment process is a refined submillimeter alignment 550 (an example of which is shown in FIG. 10B). Each of the DNN models in FIGS. 4A and 4B may execute in parallel and the DNN model with the slowest execution time determines the total run time.

Figure 5:
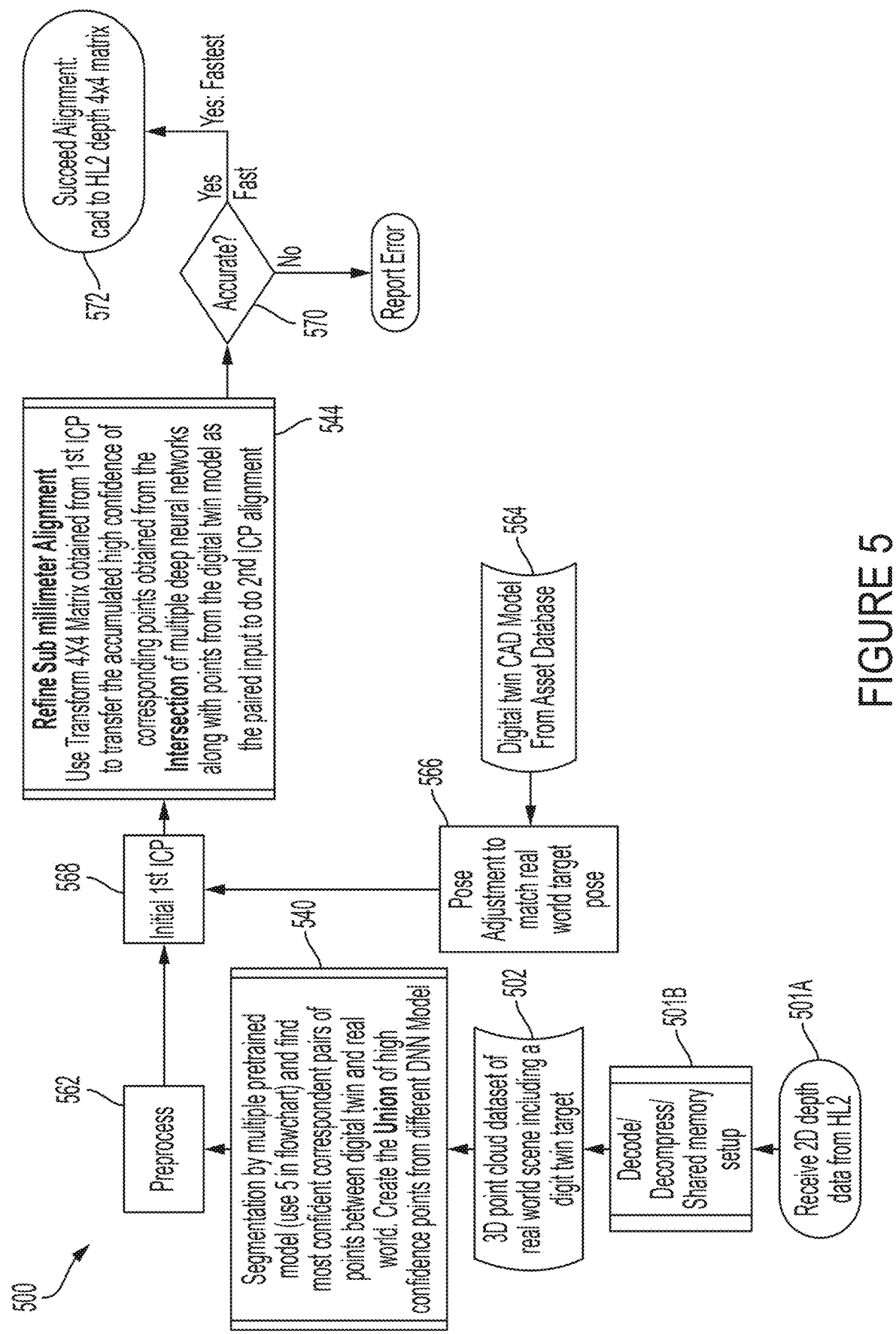
FIG. 5 illustrates more details of the alignment method.

FIG. 5 illustrates more details of the alignment method 500. As with the method in FIGS. 4A and 4B, the method 500 may be performed by the aligner 106C in FIG. 1 and the mixed reality system described above may also be implemented using other systems in which it is desirable to improve image processing and 3D object tracking as part of a larger system and method. In one embodiment, the processes of the method 500 shown in FIGS. 4A and 4B may be each implemented as a plurality of instructions/code that are executed by a processor of a computer system of the backend 106 wherein the instructions/code configure the processor or cause the processor to perform the below described processes. Similar to FIGS. 4A and 4B, the alignment processes may be done in parallel.

Figure 6:
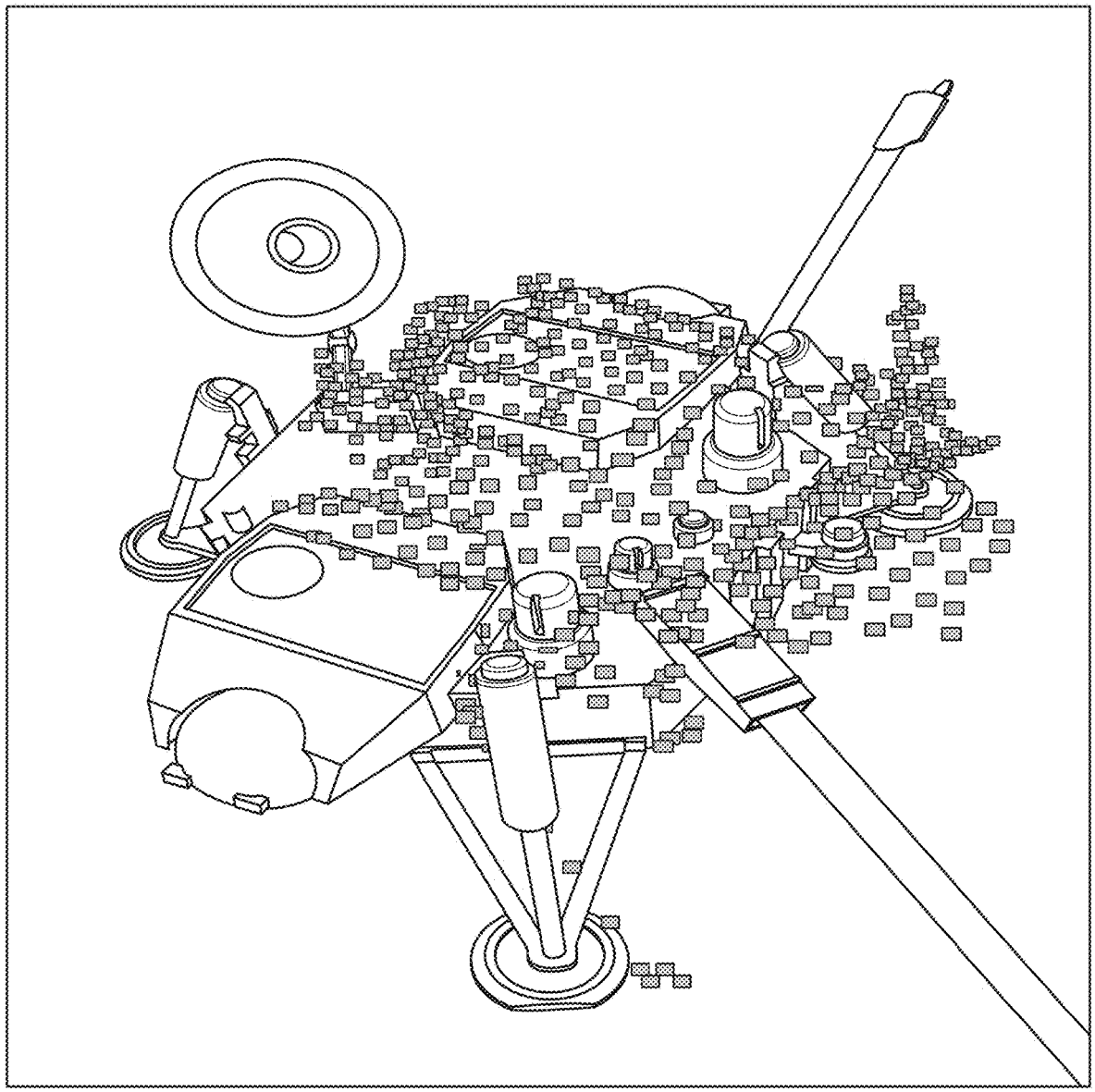
FIG. 6 illustrates an example of a real-world object and digital twin without any submillimeter alignment.

As shown in FIG. 5, the aligner 106C may receive 2D depth data (501A) from a computing device such as the Hololens 2 (HL2) that is seeking to align the points extracted from digital CAD model in a virtual 3D scene with the points of the digital twin inside a real world 3D scene. The 2D depth data may be decoded/decompressed (501B) to a shared memory setup from which the data may be processed. The method may also receive a 3D point cloud dataset of real world scene including a digital twin (502). FIG. 6 illustrates an example of a real-world object (a Mars Viking lander) and its digital twin without any alignment and shows that the alignment is very poor which would cause the problems (dangerous medical procedure by a robot or a poor impression of the accuracy of the system) as mentioned above. The points (real world scan by AR glass) have >45-degrees error in rotation in the overlay plot with the virtual digital CAD lander model Therefore, the method performs an alignment. For example, using the multiple pre-trained models (such as the models shown in FIGS. 4A), the data may be segmented to find, for each pre-trained model, the most confident corresponding pairs of points between the digital twin the real world data (506-530). The method may then, as described above, find a union (540) of the high quality/high confidence points from the different pre-trained models. FIGS. 7A and 7B shown an example of the union of points 700A-E, 702A-E from the different pre-trained models from two different view angles using the same initial point cloud. As shown in each figure, each different pre-trained model identifies different points in different parts of the point cloud 700A-E and 702A-E. The union points are used for coarse alignment and intersection (the center cluster 700X, 702X with five colors overlapped/adjacent to each other) used for refined alignment are categorized clusters by the pretraining models.

In one example shown in FIGS. 7A and 7B, five different pretrained models shown in FIGS. 4A and 4B each identify a subregion of high confidence in the whole point cloud with model 1 (PointCNN trained by ScanNet data) identifying points 700A, 702A, model 2 (PointCNN trained by S3DIS data) identifying points 700B, 702B, model 3 (RandLA) identifying points 700C, 702C, model 4(3DBonet) identifying points 700D, 702D and the last model (3Dbonet training with inadequate data) identifying points 700E, 702E. All of these points are high confidence points and each pretrained models identified high confidence points in two regions (a separate region for that model and the points for the model in the intersection region 700X, 702X.)

The five regions are the Union of all points with highest confidence (for example, top 20 percent confidence of categories by each pretrained model) and this Union of identified 3D points are used as the input for coarse alignment. These union of the point reduce the complexity of original point cloud as all the other points (not identified as high confidence points by the pretrained models) are removed and majority of those other points are from noise, unidentified features or distortion. The simplified input point cloud union, which also incorporated more features of spatial geometry identified by five DNN models, is more likely to be the corresponding pair of points between two point clouds (point cloud from real world point cloud and point cloud from virtual 3D semantic reference scene) to help achieve better alignment. As shown in the figures, the models also did similar region identification on virtual digital reference point cloud to establish the best correspondence point clusters as the input pair needed for alignment (extracted and simplified subset of both original real-world scan and virtual digital point cloud model) in both coarse and refine stage of alignment.

For the intersection regions 700X, 702X, each of the models predicts/labels the same intersection region (5 color close to each other that can be identified by a clustering Euclidian distance between different labeled color region) with certain confidence, so the intersection region is feature rich region that may be used to refine alignment that also match the real world lander. On the other hand, the points not labeled by any DNN model are more likely to be random background, noise, distortion etc. and can be safely removed from the input to the alignment workflow so that the alignment method only use points with maximum likelihood to be corresponding region of the virtual digital 3D scene or digital twin target as the simplified real world point cloud input and use virtual digital counterpart corresponding region as the simplified virtual world point cloud input. This way the solution exploring domain of alignment method can get significantly reduced and simplified.

Returning to FIG. 5, the method 500 may optionally perform a cross validation between the 2D MaskRCNN model and the 3D data (560). MaskRCNN is a publicly available 2D segmentation tool that can help do segmentation and provide another reference to further confirm the high confidence region 3D points that also have high confidence in 2D pixel in RGB pictures. The method may then preprocess the union data (562) using the output of the cross validation process. During the preprocessing, routine publicly available computer vision process are executed that can further remove some noise points and narrow down the alignment region (for example, use eye focus attention model to assign more weight to do alignment user's eye is focused on. The method may retrieve a digital twin CAD model (564) from an asset database of the backend 106 and may perform pose adjustment to match the real world target pose (566) and output an adjusted pose digital twin. The CAD 3d model may be of any standard format, such as .obj, .ply or .stl, and the model format can be convert to each other easily when needed. The CAD model file (have point connection 3D mesh and exact XYZ location of each point) is file needed for a 3D printer to create a real world object of exact same shape as the designer draws using the computer and it can be also used to create pretty 3D rendering by unity3D and HoloLens due to the submillimeter alignment.

Figure 8B:
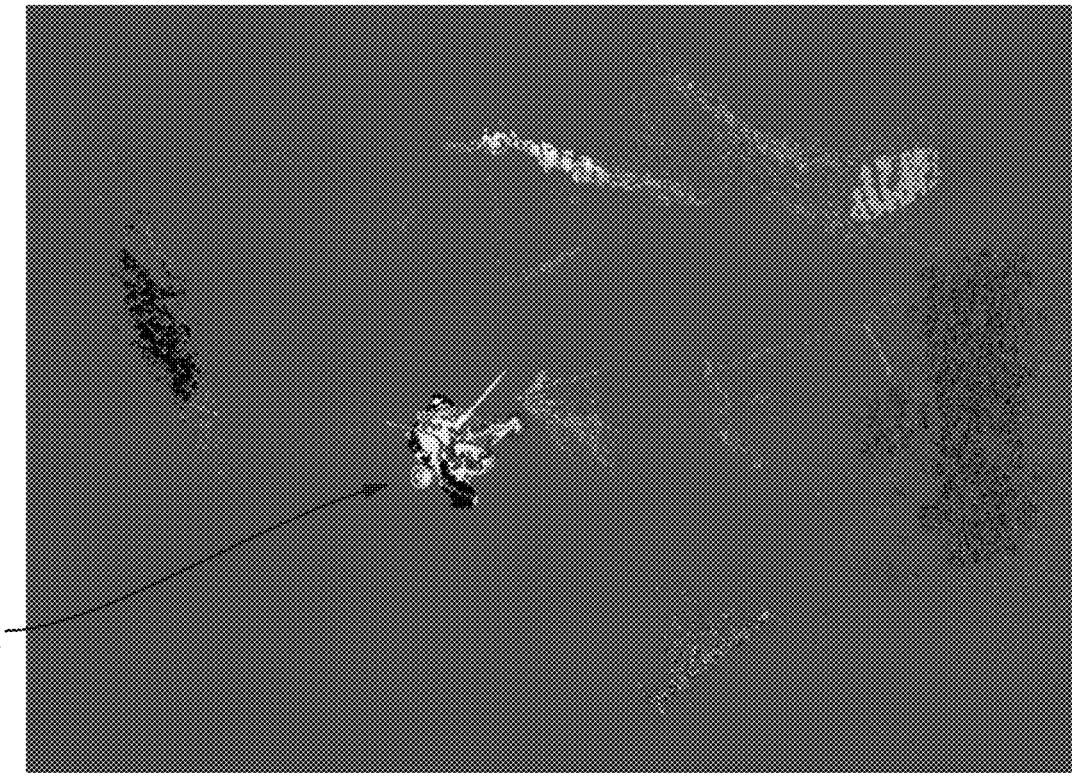
FIGS. 8A-8C show the alignment of the object and digital twin after coarse alignment and the union of the point clouds in FIGS. 7A and 7B used to perform the coarse alignment, respectively.
Figure 8A:
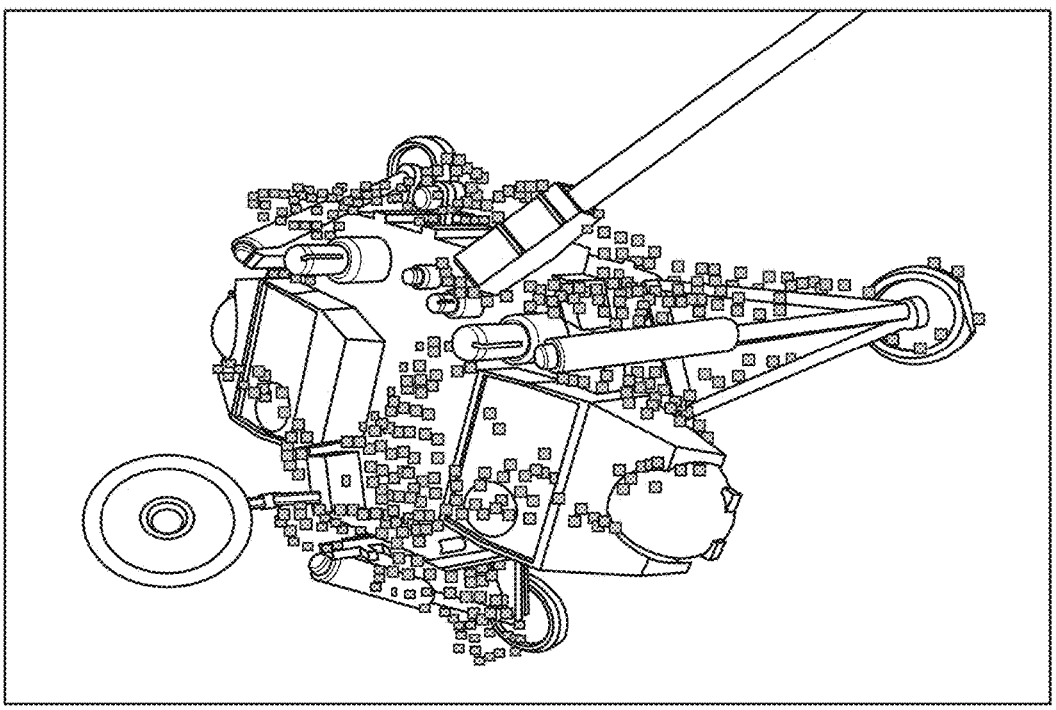
Figure 8C:
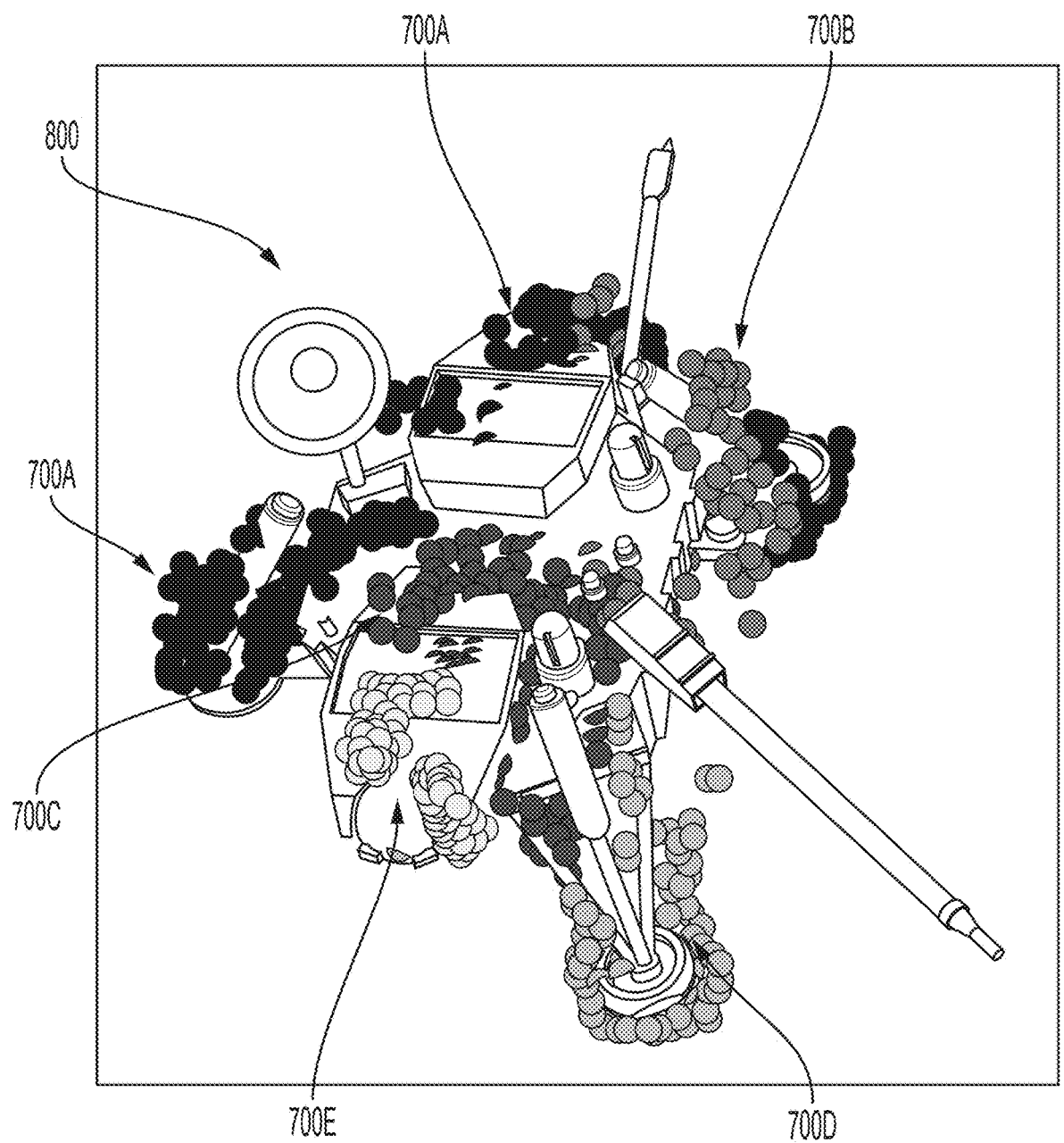

The method 500 may perform an initial iterative closest point (ICP) process 568 based on the pose adjusted digital twin and the preprocessed union data to perform the coarse alignment between the real world object and the digital twin. FIG. 8A shows the alignment of the object and digital twin after coarse alignment (with the real object shown as an image and the points of the digital twin with coarse alignment shown as squares with each square representing real world scanned 3D points by a scanner (for example, Holo-Lens) related to the digital twin CAD model. As shown in FIG. 8A, the alignment is still very rough and does not meet the criteria for a good alignment as discussed above. FIG. 8B shows the union of the point clouds for the coarse alignment based on the high confidence points from the pre-trained models shown in FIGS. 7A and 7B. FIG. 8C is a zoomed in view of the intersection region 800 with the high confidence points for each of the pretrained models 700A-700E and the lander. In the method, the coarse alignment outputs a coarse affine transform matrix and this centimeter accuracy coarse affine transform matrix (centimeter accuracy shown in FIG. 8A) can transfer real world point cloud to get better overlay than the original alignment shown in FIG. 6.

The method may also use the union of points to refine the submillimeter alignment (544) in which the accumulated high confidence point pairs are obtained from an intersection 800 (also referenced as 700X or 702X in FIGS. 7A and 7B) of all the points from each of the models as shown in FIG. 8B. The intersection is a portion of the point cloud at which each of the models had identified high confidence point pairs. Thus, in the second stage of alignment, the align refinement uses commonly detected regions, the center which has points identified by each of the models that overlap/adjacent to each other as shown in FIG. 8B. This center intersection region 800 has the highest accumulated confidence and vote score from all the models, such as five models in the example. The center intersection region 800 is a cluster with high confidence points from each of the pretrained models adjacent/overlapped with each other and high confidence labels from multiple different types of DNN models, The method may apply further thresholds to only keep a certain top percent of these points in the center intersection region 800. 3D points in this highest confidence region are almost free of noise and can be used as high correspondence confidence region to achieve best alignment results. Although the intersection vote of five models has much less 3D points than the original raw input 3D points from a 3D scanner, the quality of points is the best we can select from the five pretrained DNN models outputs, thus the final alignment can be improved to be submillimeter level as in FIG. 9.

Returning to FIG. 5, the method may determine if the refinement 544 is accurate (570) with accuracy determined point to point distant metrics such as RMSE and Chamfer distance and succeed with alignment (572) and provide a depth 4×4 affine transform matrix to the computing device that can then display the digital twin of the real world object with accurate alignment. Note that an accurate alignment using the intersection points may be the fastest alignment process. If the intersection based alignment is not accurate enough, an error message is generated.

Figure 9:
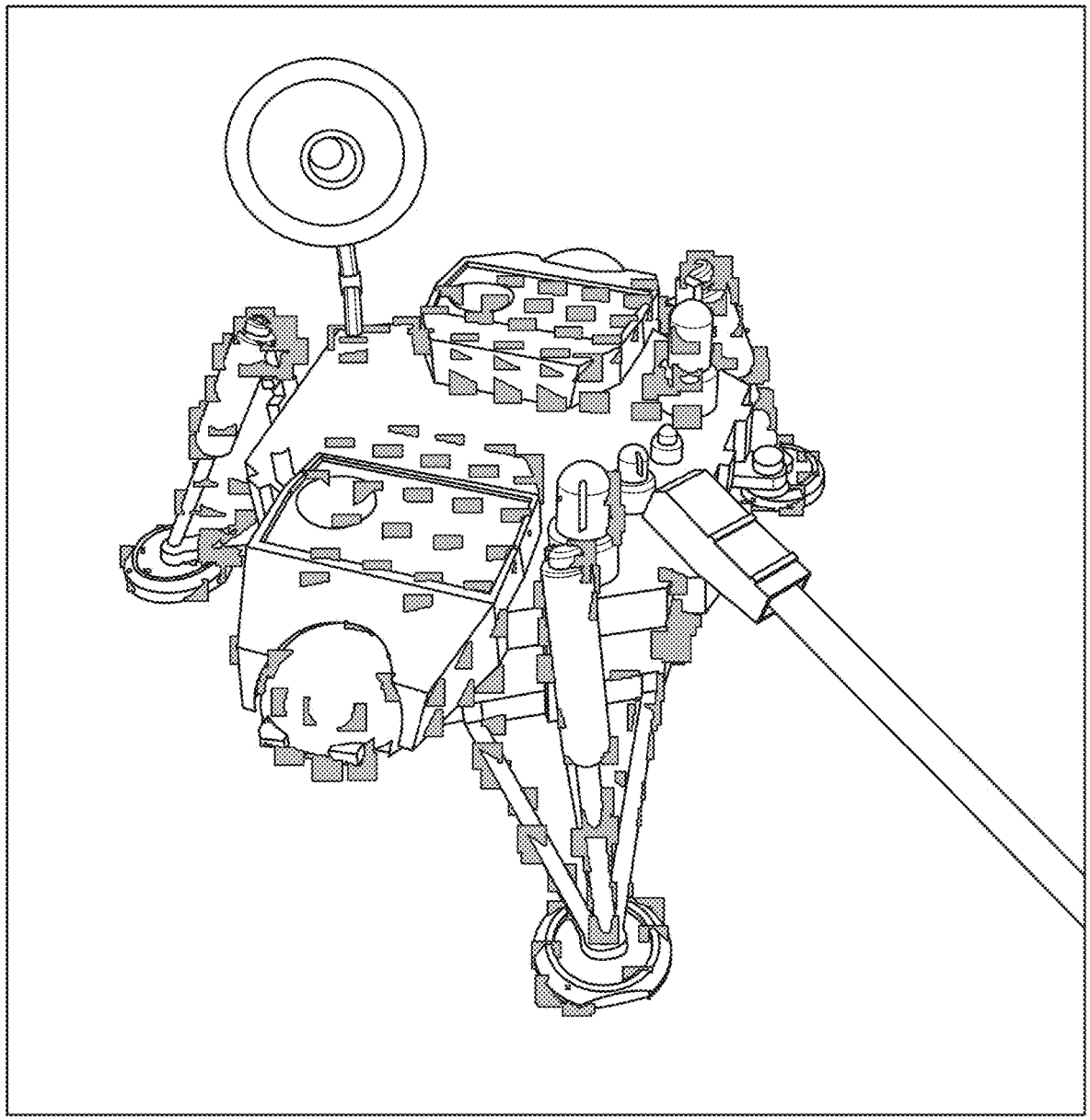
FIG. 9 illustrates the alignment of the object and the digital twin after the submillimeter alignment has been performed; and the intersection of the labeled point clouds in FIGS. 7A and 7B.

For the example of the Mars Viking lander and its digital twin, if any one of the alignment subprocesses are sufficiently accurate, then the center intersection region 800 based method achieves sub-millimeter alignment accuracy, an example of which is shown in FIGS. 9 and 10B with the image of the real world Mars Viking lander and patches that represent the alignment pairs produced by the alignment method. The sub millimeter alignment result is achieved (examples of which are shown in FIGS. 9 and 10B) using the intersection 800 for all of the pretrained models. For comparison a centimeter accuracy alignment for the same Mars Viking lander is shown in FIG. 10A. As shown, in the less accurate alignment in FIG. 10A, the alignment pairs are bunched together and do not capture the shape and surfaces of the Mars Viking lander.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, edge computing devices, cloud computing platform, and other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices and cloud services.

The software, circuitry and components herein may also include and/or utilize one or more types of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can be accessed by computing component. Communication media may comprise computer readable instructions, data structures, program modules and/or other components. Further, communication media may include wired media such as a wired network or direct-wired connections; however no media of any such type herein includes transitory media. Combinations of any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (Single instruction, multiple data—SIMD—instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains those variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
retrieving a point cloud for a three dimensional scene, the three dimensional scene having an object;
retrieving a digital twin of the object for use in a mixed reality environment;
training a deep learning computer system having a plurality of learning models each trained with a dataset, the deep learning computer system being used to provide improved input with higher corresponding confidence in points pairs between the three dimensional scene and a digital world to align the digital twin in the mixed reality environment with the object;
generating, for each learning model, at least a high confidence cluster having one or more high confidence points of the point cloud that are likely part of the object and a low confidence cluster having points of the point cloud likely to be background clutter, noise or distortion;
generating a union of the high confidence cluster from each of the high confidence clusters of each of the plurality of learning models;
performing a coarse alignment of the object and the digital twin using the points in the high confidence cluster union;
summing the points in the high confidence cluster for each of the plurality of learning models to generate a set of highest accumulated confidence points in an intersection region that is associated with the one or more high confidence points of the point cloud from all of the plurality of learning models in a same region; and
refining the coarse course alignment of the object and the digital twin using the intersection region that contains the set of highest accumulated confidence points.

2. The method of claim 1, wherein training the plurality of learning models further comprises training three learning models using three different datasets.

3. The method of claim 2, wherein training the plurality of learning models further comprises training a PointCNN model with a Scannet dataset to generate a first trained PointCNN model, training a second PointCNN model with a S3DIS dataset to generate a second trained PointCNN model, training a RandLA model with the S3DIS dataset to generate a RandLA trained model, training a 3DBotNet model with the S3DIS dataset to generate a first trained 3DBotNet model and training a second 3DBotNet model with inadequate data of the digital twin to generate a second trained 3DBotNet model.

4. The method claim 1, wherein training the plurality of learning models further comprises pretraining five learning models.

5. The method of claim 1, wherein refining the coarse alignment further comprises using an affine transform matrix to refine the coarse alignment of the object and the digital twin.

6. A system, comprising:
a computer system having a processor and a memory wherein the processor executes a plurality of lines of instructions so that the processor is configured to:
retrieve a point cloud for a three dimensional scene, the three dimensional scene having an object;
retrieve a digital twin of the object for use in a mixed reality environment;
train a plurality of learning models each trained with a dataset, the plurality of learning models being used to provide improved input with higher corresponding confidence in points pairs between the three dimensional scene and a digital world to align the digital twin in the mixed reality environment with the object;
generate, for each learning model, at least a high confidence cluster having one or more high confidence points of the point cloud that are likely part of the object and a low confidence cluster having points of the point cloud likely to be background clutter, noise or distortion;
perform a coarse alignment of the object and the digital twin using the points in a union of high confidence clusters from each of the plurality of learning models;
sum the points in the high confidence cluster for each of the plurality of learning models to generate a set of highest accumulated confidence points in an intersection region that is associated with the one or more high confidence points of the point cloud from all of the plurality of learning models in a same region; and
refine the coarse alignment of the object and the digital twin using the intersection region that has the set of highest accumulated confidence points.

7. The system of claim 6, wherein the processor is further configured to generate a union of the one or more high confidence points of the point cloud in the high confidence cluster for each of the plurality of learning models to perform the coarse alignment.

8. The system of claim 6, wherein the processor is further configured to train at least three different learning models using at least three different datasets.

9. The system of claim 8, wherein the processor is further configured to train a PointCNN model with a Scannet dataset to generate a first trained PointCNN model, train a second PointCNN model with a S3DIS dataset to generate a second trained PointCNN model, train a RandLA model with the S3DIS dataset to generate a RandLA trained model, train a 3DBotNet model with the S3DIS dataset to generate a first trained 3DBotNet model and train a second 3DBotNet model with inadequate data of the digital twin to generate a second trained 3DBotNet model.

10. The system claim 6, wherein the processor is further configured to pretrain five learning models.

11. The system of claim 6, wherein the processor is further configured to use an affine transform matrix to refine the coarse alignment of the object and the digital twin.

12. A method to display an aligned digital twin for a real world object, the method comprising:
retrieving a point cloud for a three dimensional scene, the three dimensional scene having an object;
retrieving a digital twin of the object for use in a mixed reality environment;
training a deep learning computer system having a plurality of learning models each trained with a dataset, the deep learning computer system being used to provide improved input with higher corresponding confidence in points pairs between the three dimensional scene and a digital world to align the digital twin in the mixed reality environment with the object;
generating, for each learning model, at least a high confidence cluster having one or more high confidence points of the point cloud that are likely part of the object and a low confidence cluster having points of the point cloud likely to be background clutter, noise or distortion;

performing a coarse alignment of the object and the digital twin using the points in a union of high confidence clusters for each of the plurality of learning models;

summing the points in the high confidence cluster for each of the plurality of learning models to generate a set of highest accumulated confidence points in an intersection region that is associated with the one or more high confidence points of the point cloud from all of the learning models in a same region;

refining the coarse alignment of the object and the digital twin using the intersection region that has the set of highest accumulated confidence points; and displaying the digital twin with sub-millimeter alignment based on the refined alignment.

13. The method of claim 12, wherein performing the coarse alignment further comprises generating a union of the one or more high confidence points of the point cloud in the high confidence cluster for each of the plurality of learning models.

14. The method of claim 12, wherein training the plurality of learning models further comprises training three different learning models using three different datasets.

15. The method of claim 14, wherein training the plurality of learning models further comprises training a PointCNN model with a Scannet dataset to generate a first trained PointCNN model, training a second PointCNN model with a S3DIS dataset to generate a second trained PointCNN model, training a RandLA model with the S3DIS dataset to generate a RandLA trained model, training a 3DBotNet model with the S3DIS dataset to generate a first trained 3DBotNet model and training a second 3DBotNet model with inadequate data of the digital twin to generate a second trained 3DBotNet model.

16. The method claim 12, wherein training the plurality of learning models further comprises pretraining five learning models.

17. The method of claim 12, wherein refining the coarse alignment further comprises using an affine transform matrix to refine the coarse alignment of the object and the digital twin.

18. A virtual reality system, comprising:
a virtual reality headset connected to a computer system;
the computer system having a processor and a memory wherein the processor executes a plurality of lines of instructions so that the processor is configured to:
retrieve a point cloud for a three dimensional scene, the three dimensional scene having an object;
retrieve a digital twin of the object for use in a mixed reality environment;
train a plurality of learning models each trained with a dataset, the plurality of learning models being used to provide improved input with higher corresponding confidence in points pairs between the three dimensional scene and a digital world to align the digital twin in the mixed reality environment with the object;

generate, for each learning model, at least a high confidence cluster having one or more high confidence points of the point cloud that are likely part of the object and a low confidence cluster having points of the point cloud likely to be background clutter, noise or distortion;

perform a coarse alignment of the object and the digital twin using a union of the points in the high confidence clusters for each of the high confidence clusters from each of the plurality of learning models;

sum the points in the high confidence cluster for each of the plurality of learning models to generate a set of highest accumulated confidence points in an intersection region that is associated with the one or more high confidence points of the point cloud from all of the plurality of learning models in a same region; and refine the coarse alignment of the object and the digital twin using the intersection region that has the set of highest accumulated confidence points; and the virtual reality headset able to display the digital twin with sub-millimeter alignment based on the refined alignment.

19. The system of claim 18, wherein the processor is further configured to generate a union of the one or more high confidence points of the point cloud in the high confidence cluster for each of the plurality of learning models to perform the coarse alignment.

20. The system of claim 18, wherein the processor is further configured to train at least three different learning models using at least three different datasets.

21. The system of claim 20, wherein the processor is further configured to train a PointCNN model with a Scannet dataset to generate a first trained PointCNN model, train a second PointCNN model with a S3DIS dataset to generate a second trained PointCNN model, train a RandLA model with the S3DIS dataset to generate a RandLA trained model, train a 3DBotNet model with the S3DIS dataset to generate a first trained 3DBotNet model and train a second 3DBotNet model with inadequate data of the digital twin to generate a second trained 3DBotNet model.

22. The system of claim 18, wherein the processor is further configured to pretrain five learning models.

23. The system of claim 18, wherein the processor is further configured to use an affine transform matrix to refine the coarse alignment of the object and the digital twin.

* * * * *